Figure 16:
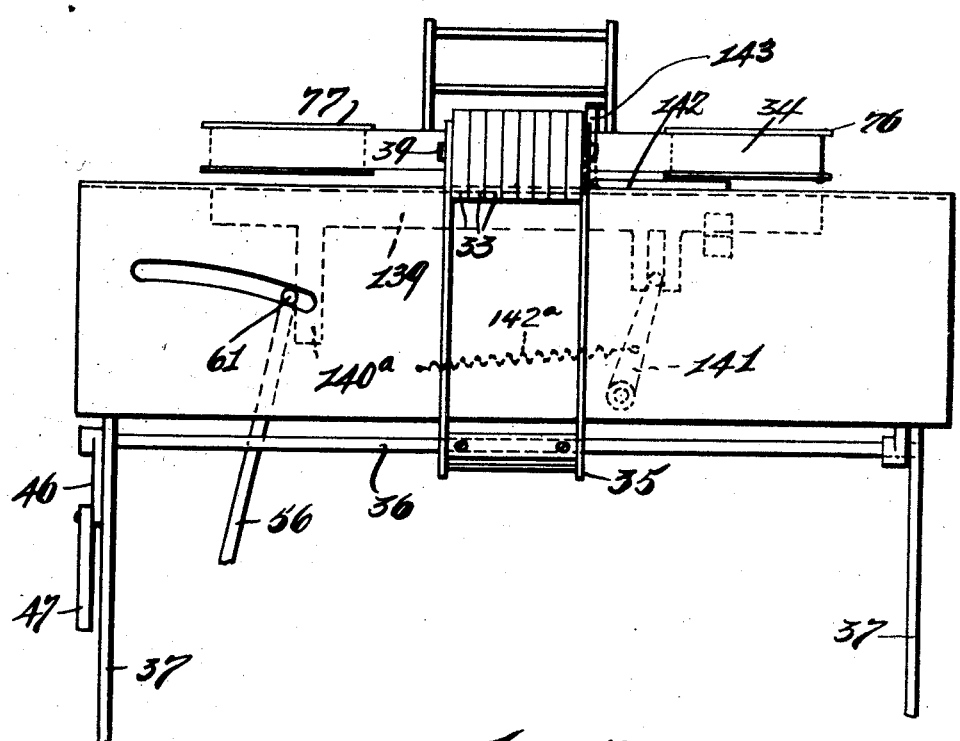

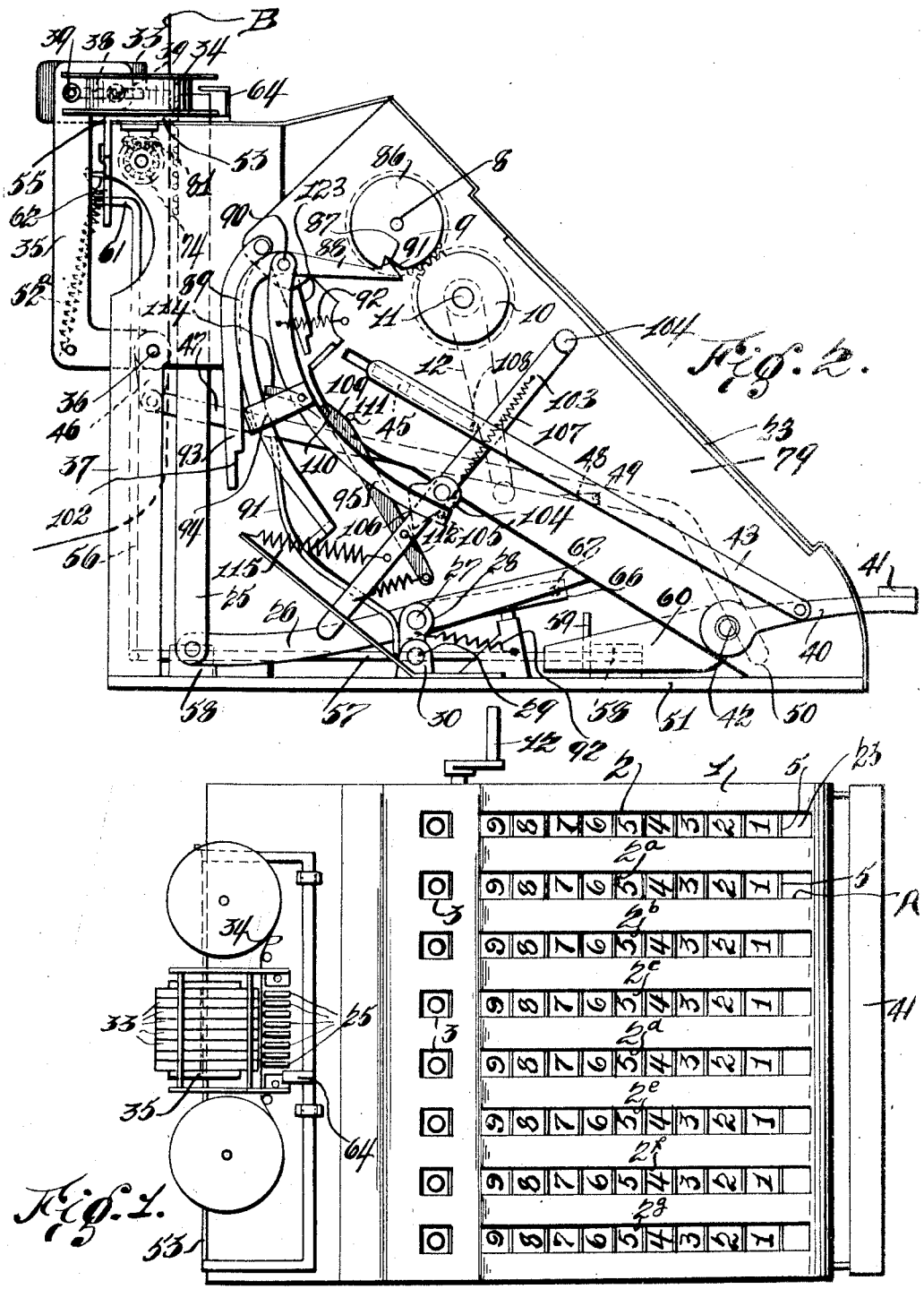

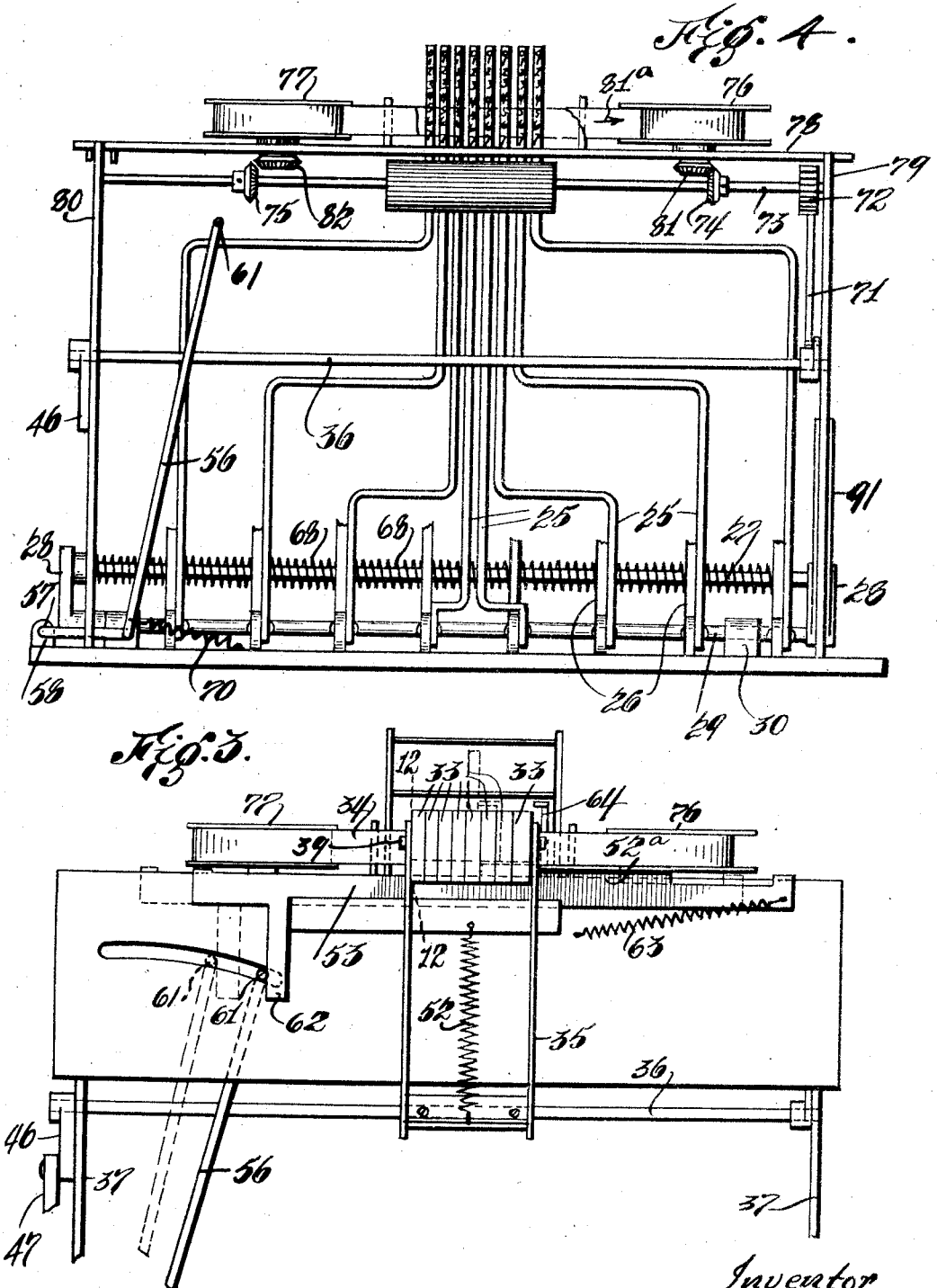

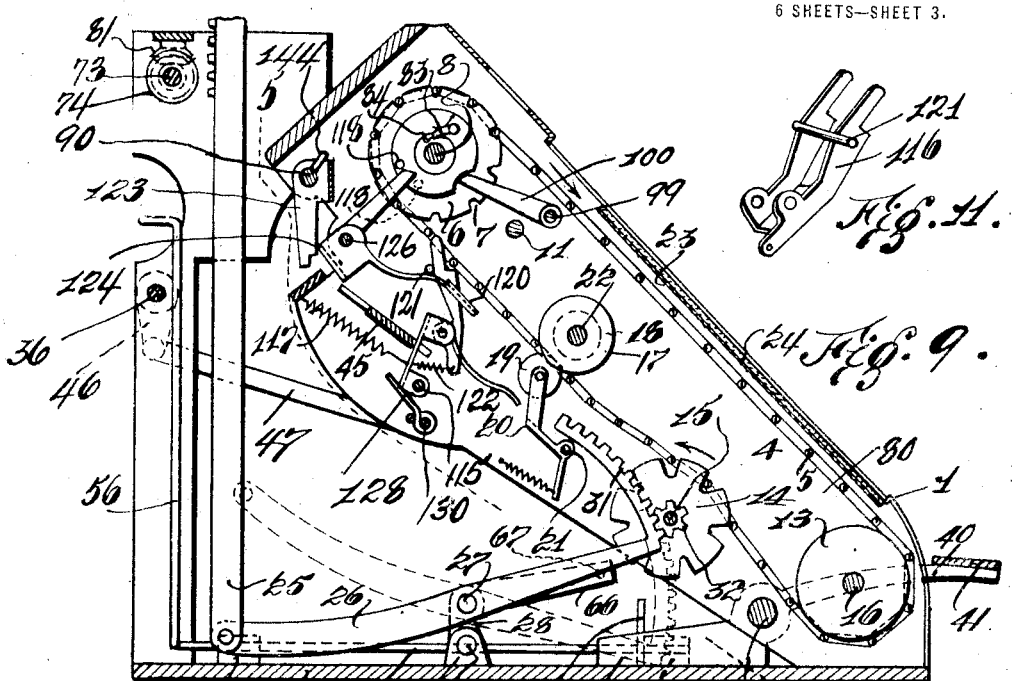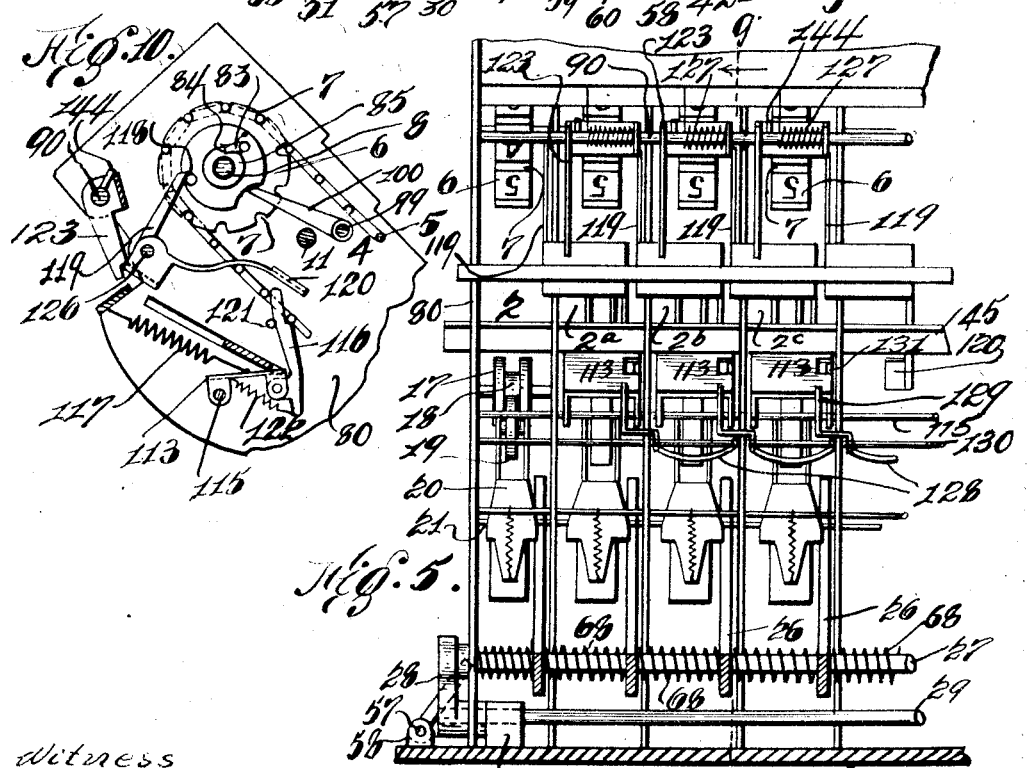

O. ANTONELLI.
ADDING MACHINE.
APPLICATION FILED JULY 3, 1915.
1,193,968.
Patented Aug. 8, 1916.
6 SHEETS—SHEET 4.
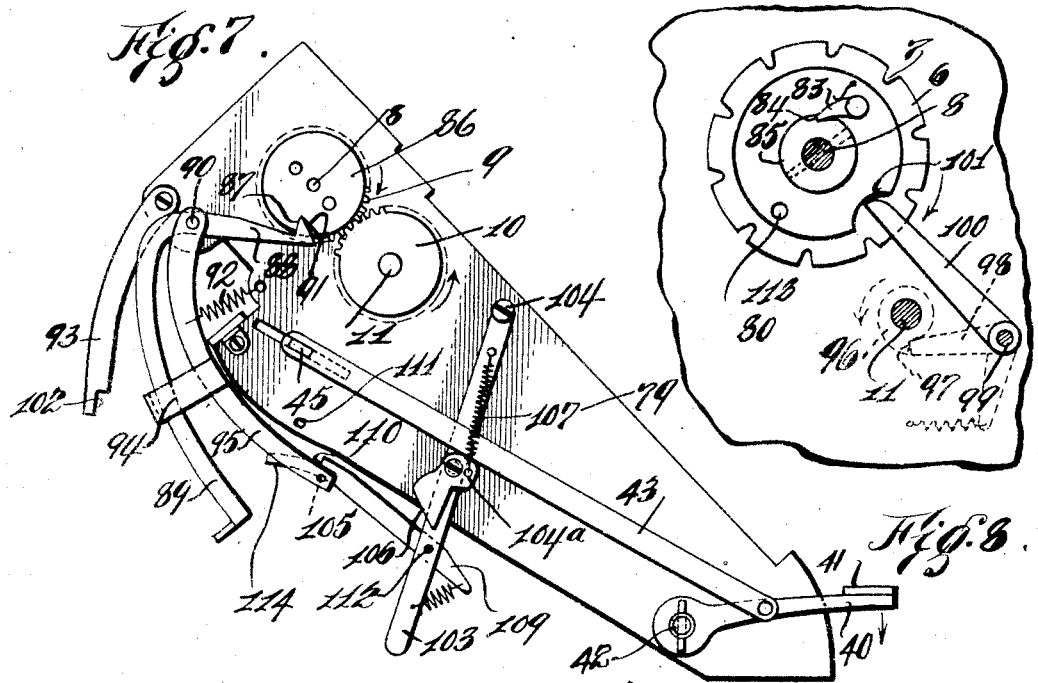
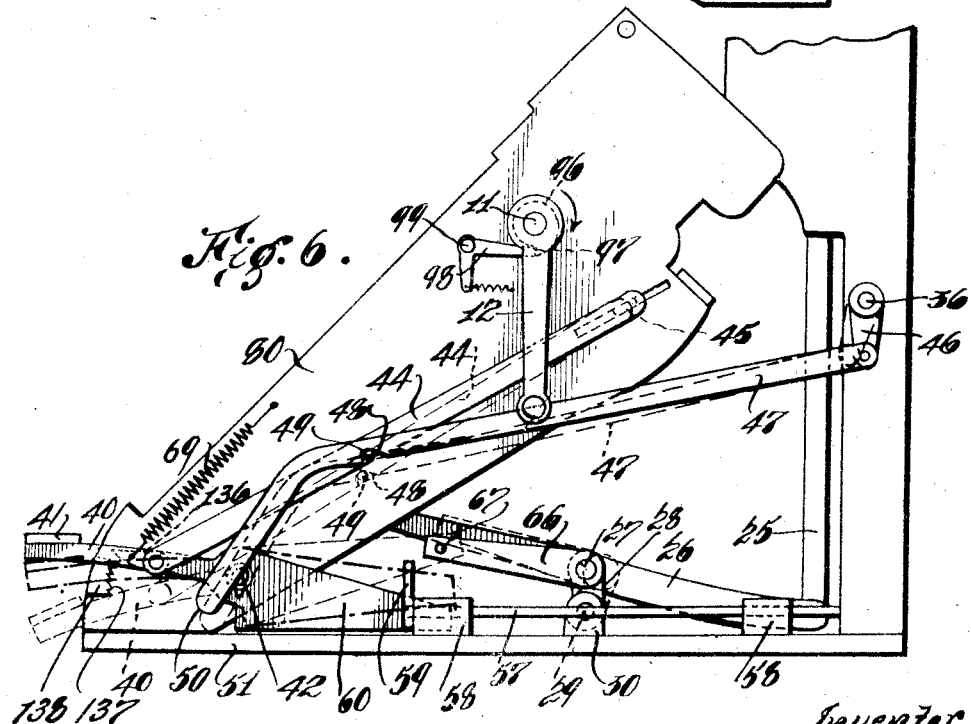
Witness
C. A. Jarvis
Inventor
Orazio Antonelli
Maurice Bloch
attorney O. ANTONELLI.
ADDING MACHINE.
APPLICATION FILED JULY 3, 1915.
1,193,968.
Patented Aug. 8, 1916.
6 SHEETS—SHEET 5.
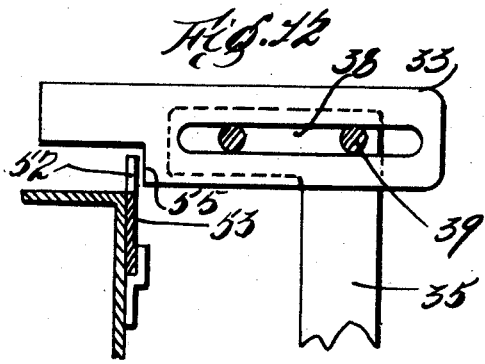
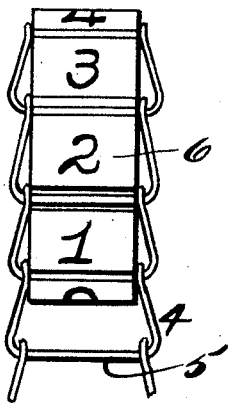
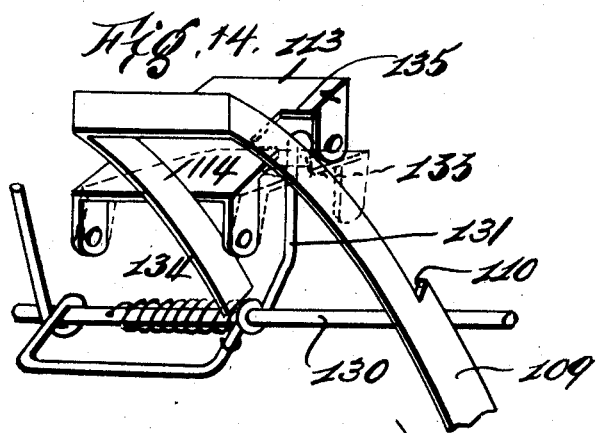
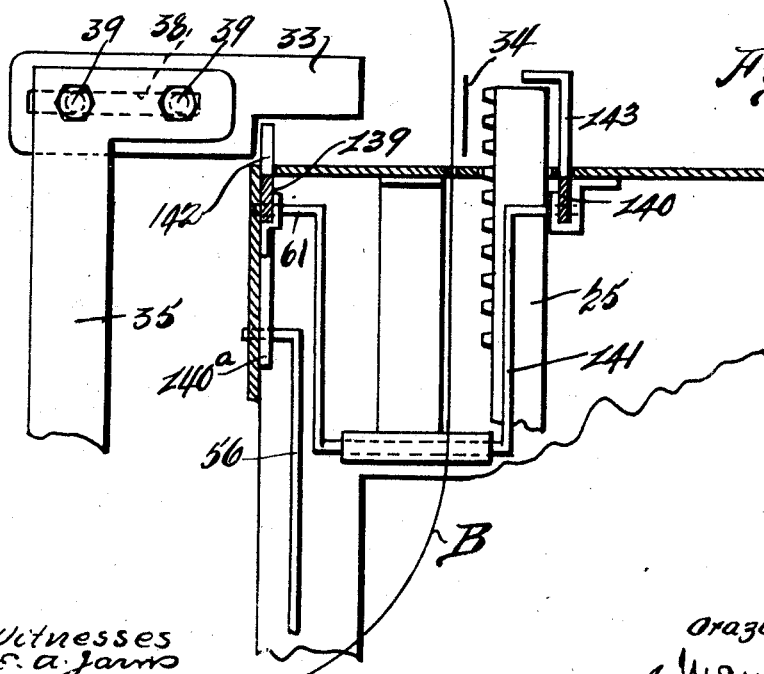
Witnesses
E. A. Jarvis
Inventor
Orazio Antonelli
by Maurice Bloch
attorney

UNITED STATES PATENT OFFICE.

ORAZIO ANTONELLI, OF JERSEY CITY, NEW JERSEY, ASSIGNOR TO ABRAHAM DRUSIN, OF BROOKLYN, NEW YORK.

ADDING-MACHINE.

1,193,968.  Specification of Letters Patent.  Patented Aug. 8, 1916.

Application filed July 3, 1915. Serial No. 37,799.

*To all whom it may concern:*

Be it known that I, ORAZIO ANTONELLI, a subject of the King of Italy, residing at Jersey City, Hudson county, and State of New Jersey, have invented certain new and useful Improvements in Adding-Machines, of which the following is a full, clear, and exact description.

This invention relates to improvements in adding machines, the object being to provide such a device by which means a plurality of items can be totalized.

A further object of my invention is to provide a recording mechanism by the aid of which the items can be printed on a sheet of paper (for instance) and finally the sum of the items.

A still further object of the invention is to accomplish the above named results by means of a simple but effective mechanism that can be cheaply manufactured and sold.

Further features of improvement will hereinafter appear.

I will now proceed to describe my invention in detail, the essential features of which will be summarized in the appended claims, reference being had to the accompanying drawings, forming part hereof; wherein—

Figure 1 is a top plan view of an adding mechanism embodying my improvements; Fig. 2 is a side elevation thereof on a larger scale, certain parts being omitted; Fig. 3 is a rear view of the upper part of the device, the interior mechanism being omitted; Fig. 4 is a rear view of the device, the back-plate and parts carried thereby, shown in Fig. 3, being omitted, certain interior portions of the mechanism being also omitted; Fig. 5 is a fragmentary sectional rear view of the interior mechanism, certain parts being omitted, the section being taken on a line 5—5 in Fig. 9; Fig. 6 is a side view of the device looking from the left in Fig. 5, interior parts being omitted; Fig. 7 is a side view showing some of the elements shown in Fig. 2, but regardless of their relative position or operation; Fig. 8 is an enlarged detail view, showing one of the numeral disks and certain parts actuated thereby; Fig. 9 is a sectional side elevation showing one of the units of the device, the section being taken on a line 9—9 in Fig. 5; Fig. 10 is a detail fragmentary view showing the upper numeral disk of one of the units and operating mechanism therefor set for automatic advancement; Fig. 11 is a detail perspective view of one of the advancing pawls for the chains which operate the numeral disks; Fig. 12 is an enlarged detail sectional view of the printing hammers, showing also the hammer stop, the section being taken on a line 12—12 in Fig. 3 looking from the left; Fig. 13 is an enlarged front view of one of the numeral disks and a portion of the operating chain therefor; Fig. 14 is an enlarged detail perspective view showing one of the advancing pawl-frames and releasable latch operated thereby; Fig. 15 is a cross-sectional view showing a modified form of hammer stop; Fig. 16 is a rear view of the upper portion of the printing device when provided with the modified form of hammer stop.

As herein embodied my invention consists of a frame-work having a top-plate 1 (Fig. 1) provided with (in this instance) eight slots 2, 2$^a$, 2$^b$, 2$^c$, 2$^d$, 2$^e$, 2$^f$, 2$^g$, and eight openings 3 alining with the slots 2. Through the openings 3 can be seen numerals carried by rotatable disks, the disks being rotated by means of chains 4 (Fig. 9) which in turn are manually operated by the fingers which are inserted in the slots to engage the cross-bars 5 of the chains 4. The disks, carrying the numbers which appear at the openings 3 and which indicate the items to be added, are indicated by 6 in Figs. 5, 9 and 10. Each disk 6 is provided with notches 7 which are engaged by the bars 5 of the links of the chain 4. The disks 6 are loosely mounted upon a shaft 8 (Figs. 8 and 9) to one end of which is secured a gear 9, meshing with a gear 10 carried by a shaft 11 provided with a handle 12.

The chains 4, which rotate the disks 6, pass around idlers 13 located at the opposite end of the frame-work. The chains 4 also rotate sprocket-pulleys 14 which in turn actuate the type-carriers to be hereinafter referred to, the said sprockets being loosely mounted upon a bar 15 (Fig. 9), the idlers 13 being loosely mounted upon a bar 16.

To act as a check, I provide a sheave or idler 17 for each chain, the sheave having an annular groove 18 (Figs. 5 and 9), and a roller pawl 19 carried by a frame or bracket 20 loosely mounted upon a bar 21, the sheaves or idlers being carried by a bar 22.

When the chains 4 are pulled the numeral disks 6 will rotate, as will the idlers 13. The function of the roller-pawls is to prevent the overrunning of the disks 6 by rolling or springing into the space between the bars 5, as shown in Fig. 9.

As illustrated in Fig. 1, the disks 6 are set at zero. Should I desire to record the numeral sixty-eight (cents, for instance) I will place a finger at 6 in the slot 2$^a$ and pull the chain 4 (alining with said slot) downwardly until the finger contacts with the plate 1 at the lower end of the slot, or, in other words, until the finger reaches the space A. After having performed this operation, the numeral six would appear at the opening 3 in line with the slot 2$^a$. I then perform the same operation in the slot 2, starting with the numeral 8. The numeral sixty-eight will then appear at the openings 3 in line with the slots 2 and 2$^a$. The numerals 1 to 9, inclusive, shown in Fig. 1 are carried by a stationary plate 23 covered by a glass plate 24 (Fig. 9). The length of each slot 2 to 2$^a$, inclusive, is equal to the circumference of its corresponding disk.

To record the amount which appears at the openings 3, I provide type-carriers 25, one for each chain 4. In this instance, the type-carriers are vertically disposed and are actuated by levers 26 loosely mounted upon a bar 27 carried by a rocking-frame 28 which in turn is secured to a shaft 29 mounted in bearings 30 (Figs. 2, 5, 6 and 9). Each lever 26 carries a rack 31 which meshes with a gear 32 carried by each sprocket-idler 14. As a chain is moved to rotate a disk 6, its idler 14 will also rotate, causing its type-carrier to rise, as shown by dotted lines in Fig. 9, to cause a type, which corresponds to the number selected on the plate 23, to aline with a corresponding printing hammer 33 (Fig. 3). For instance, as the numeral 68 was selected for illustration and it was shown that the said numeral would appear at the openings 3 alining with the slots 2 and 2$^a$, the numeral 68 would be presented, by the type-carriers corresponding to the actuated chains, for printing upon a sheet of paper (B, Fig. 2), the said paper, however, passing between the printing-hammers 33 and inking ribbon 34.

The printing hammers 33 are carried by a swinging frame 35 carried by a rotatable shaft 36 mounted in the frame standards 37. Each of the hammers 33 is provided with a slot 38 through which the pins 39, carried by the frame 35, pass (see Figs. 2 and 12).

To record the item selected, I provide means to cause the hammers 33 to strike the paper to force it against the ribbon, which in turn will be forced against the type representing the item to be recorded. The means above-referred to comprises a set of levers 40, one at each side of the frame-work. The said levers are connected at their outer ends by a bar 41 (Figs. 2 and 9), the inner end of each lever 40 being secured to a rotatable shaft 42. Each lever 40 is by means of links 43 and 44 connected to a slidable bar 45, the function of which will be hereinafter described. It may here be stated that the levers 40 and links 43 and 44 perform a double function—that of operating the bar 45 and that of operating the printing mechanism.

To operate the printing mechanism or hammers 33, I provide the shaft 36, which carries the hammer-frame 35, with an arm 46 (Figs. 2 and 6) to which is secured one end of a link 47 having a notch 48 normally engaged by a pin 49 on the link 44.

To record the item selected the bar 41 will be pressed downwardly, thereby drawing the arm 46 ahead and rotating the shaft 36, which action will swing the hammer-frame outwardly or away from the type. At a predetermined point the end 50 of the link 47 will strike the bed-plate 51 of the device (see dotted lines Fig. 6), thereby arresting further downward movement of said link, but the arms 40 will continue to move downwardly, thereby causing the pin 49 to leave the slot 48, after which the spring 52$^a$ (Figs. 2 and 3) will snap the frame 35 back, causing the hammers to cause the imprint of the alining type to appear on the record sheet. The pin 49 will leave the slot 48 before the arms reach the limit of their downward stroke.

It will of course be evident that when the hammer-frame 35 is moved forward by the spring 52$^a$ all of the hammers will move forward also and if some means were not provided to block off those hammers not needed, a record not only of the selected item would be made, but also of all the zero digits in the line, as the carriers 25 will be normally positioned to cause the zero digits to aline with the hammers 33.

To block off the hammers not needed, I provide a blocking-off plate 52 carried by a slidable frame 53 (Figs. 2, 3 and 12), the plate 52 being arranged to be moved across the face of shoulders 55 on each hammer 33 (see Fig. 12 particularly). To operate the slide 53 I provide a pivotal lever consisting of an arm 56 (Figs. 3, 4 and 9) carried by a shaft 57 journaled in bearings 58 on the base-plate 51.

To operate the arm 56 I provide its shaft 57 with an arm 59 which bears against a lever-arm 60 carried by the side arm 40 on one side of the frame-work (see Fig. 6). To control the operation of the slide 53 I provide the upper end of the arm 56 with a nib 61 against which a horn 62 on the slide 53 bears (Fig. 3). The slide 53 is kept in contact with the horn 62 by a spring 63, the said spring also acting to operate the slide.

When the bar 41 is depressed to actuate the hammer-carrier 35, the arm 60 will rise, thereby swinging the arm 59, on the shaft 57, outwardly thus rotating said shaft, which action moves the arm 56 to the left in Fig. 3, allowing the spring 63 to move the slide 53 to the left and causing the stop or plate 52 to move across the face of the shoulders 55 on the hammers 33. The movement of the arm 56 to the left is fixed, that is to say, it moves through a certain path which never changes; the movement of the slide 53 is variable, depending upon which carriers 25 are raised.

To control the movement of the slide I provide the same with a stop 64 (Figs. 2 and 3) arranged to move clear of the depressed carriers 25, but to contact with a raised carrier (see dotted lines Fig. 3). When the slide 53 comes to rest the blocking-off plate 52 will lie in the path of all of the depressed right-hand carriers (as seen in Fig. 3). The left-hand depressed carriers will not be blocked off, for the reason that should a record of 900 be required, the numeral 9 would be brought to the opening 3 in line with the slot 2$^b$ in the plate 1 and the carrier 25, in line therewith, would be raised; hence the numeral 9 and two zeros would be printed, but the zeros to the right of the raised carrier would be blocked off. In short, the slide 53 is brought to rest to cause the blocking-off plate 52 to be properly positioned by the stop 64, to prevent the printing of the type on the carriers on the right of the extreme right hand raised type carrier, looking from the rear of the device. The positioning of the blocking-off plate will take place during the initial movement of the arm 60 and before the pin 49 and link 47 become disengaged. When the frame 35 is snapped forward to print, the hammers blocked-off, by the plate 52, will remain stationary. For this purpose the hammers are provided with the slots 38. The pins 39 will slide forward in the slots of the stationary hammers to actuate the hammers not blocked-off. After the printing takes place the carriers 25 must be returned to the normal position to permit of the recording of an item in the same column.

To cause the carriers 25 to return to the normal position it is necessary to disengage the racks 31 and gears 32. To cause the said disengagement, I provide the carrier shaft 27 with an arm 66 (Figs. 2, 6 and 9) and said arm with a pin 67 located in the path of movement of the arm 60. Just after the arm 60 is moved far enough to cause the slot 48 and pin 49 to become disengaged, the arm 60 will strike the pin 67 on the arm 66 and raise it, which action will swing the rocking-frame 28 ahead (see dotted lines Fig. 6), causing the racks 31 to leave the gears 32, after which springs 68 (Fig. 5), one end of each of which is secured to the shaft 27, the other end to a lever 26, will return the carriers 25 to normal position, or, in other words, will lower them. When the bar 41 is released, springs 69 will return it to the normal position. As the bar 41 returns to normal position, a spring 70 (Fig. 4) will return the arm 56 to normal position, which action will force the slide 53 to normal position, the spring 70 being stronger than the spring 63.

Simultaneously with the setting of the hammer-frame 35 for a stroke, the movement of the shaft 36 will actuate a pawl 71 (Fig. 4) to rotate a ratchet-wheel 72 carried by the shaft 73 which carries gears 74 and 75. The gears 74 and 75 are arranged to, one at a time, actuate the ribbon-reels 76 and 77. The reels 76 and 77 are carried by a slide 78 mounted on the frame-members 79 and 80 (Fig. 4). As herein shown, the gear 74 is in mesh with the gear 81 for the reel 76. As long as these gears are meshed, the ribbon will be fed forward, in the direction of the arrow 81$^a$ (Fig. 4). When the reel 77 becomes depleted the slide 78 will be moved toward the left, in Fig. 4, causing the gears 75 and 82 to mesh, after which the ribbon 34 will be fed in the opposite direction each time the carrier 35 is actuated.

From the foregoing description, it will be apparent that three operations take place whenever the escapement-bar 41 is depressed, namely, firstly setting the blocking-off plate 52; secondly, actuating the printing-hammers, and, thirdly, restoring the type carriers to the normal position, the feeding of the ribbon 34 being a sub-phase of the cycle. After the escapement bar 41 has returned, a second item in the same column can be recorded.

To set the numerals for a second item it is not necessary to disturb those set for the first item (the numeral 68 being selected.) When the second item is started, the numeral six will be opposite the opening 3 for the slot 2$^a$ and the numeral eight opposite the slot 3 for the slot 2, but the carriers 25 for said columns, or slots 2 and 2$^a$ representing the columns, will be in their normal position. Should the next item be 20, I would place a finger at the numeral 2 in column or slot 2$^a$ and pull the chain downwardly to the end of the slot; this action will advance the numeral disk two spaces, causing the numeral 8 to appear at the opening 3 in line with the slot. As there are but nine numerals on the plate 33, I do not manipulate a chain for a zero; hence to record 20, I would not touch the chain in column or slot 2, for it will be remembered that the slides 25 are normally set at zero.

The addition of the second item (twenty) to the first item (sixty-eight) will cause the numeral 88 to appear at the openings 3 and 3 in line with the columns or slots 2 and 2ᵃ; thus far the two items have been added; but this total will not be recorded when the escapement-bar 41 is depressed, for the reason that as the disk in column 2ᵃ has been rotated but two spaces, its carrier 25 has been raised to cause the type for numeral 2 to register with its hammer; hence when the bar 41 is depressed the item 20 will be recorded. After the second item has been recorded and parts returned to normal, it is necessary to again manipulate the chains in columns 2 and 2ᵃ to record the total, if such record is desirable. To record the total (88) I place a finger in each column 2 and 2ᵃ at the position occupied by the numeral 8, 8, in each column and pull the chains downwardly as before. This action will destroy the total formerly shown (88), but will, however, cause the slides 25, 25 opposite the columns 2 and 2ᵃ to rise to cause the type for 88 to aline with their hammers. When the bar 41 is depressed, the total 88 will appear under the items 68 and 20 on the record sheet.

To record a total, the numeral disks will of course be moved, the amount indicated by the selected numerals in the columns. For instance, as the total in this instance was 88, each disk 6 for the chains in columns 2 and 2ᵃ were advanced eight steps; this movement actuated the carriers 25 and 25 for said disks eight steps and the numerals which would appear at the openings 3 and 3 would not be 88, but, as a matter of fact, would be 66; but it is unimportant what numerals now appear at said openings, for the reason that the previous numeral (the second item) was recorded on the sheet.

After having recorded a total, I must reset the columns to zero if I desire to have the subsequent items appear correctly at the openings 3. To reset the columns to zero, I provide the disk shaft 8 with the gear 9 which meshes with the gear 10 in the shaft 11, the latter shaft being rotated by the handle 12.

In order that the disks 6 can be independently actuated they are loosely mounted on the shaft 8 and each disk is provided with a spring-pressed pawl 83 arranged to engage a notch 84 in a disk 85 secured to the shaft 8, there being a disk 85 for each disk 6. The disks 85 will be placed upon the shaft 8 to cause the notches 84 to aline. When all of the zero marks are alined each pawl 83 will be in engagement with its notch 84. When the shaft 8 is rotated it will of course rotate the disks 85 and when a notch 84 reaches a pawl 83, they will become engaged; further movement will rotate the engaged disk 6. All of the disks 6 which have not been disturbed will rotate with the shaft 8. All of the disks 6 which have been disturbed will be picked up by the rotating disks ("picked up" being used technically) when their pawls 83 have become engaged.

To permit the shaft 8 to rotate, it is necessary to disengage the racks 31 from the gears 32. For this purpose I provide the gear 9 with a disk 86 having a notch 87 to be engaged by a pawl 88 (Figs. 2 and 7) which forms part of a lever 89 pivoted upon a shaft 90 on the frame member 79. The notch 87 is located so as to engage the pawl 88 when the zero indications appear at the openings 3.

When the shaft 8 is rotated by the action of the handle 12, shaft 11 and gear 10, the cam portion 91 of the notch 87 will force the pawl 88 downwardly and the lever 89 rearwardly, which action will cause an arm 91 on the swing-frame 28 to rock the swing-frame backwardly, which movement will cause the racks 31 to leave the gears 32, after which the disks can be rotated. In other words, the lever 89 automatically throws the racks 31 and gears 32 out of mesh during the initial movement of the resetting device. When the notch 87 and pawl 88 again become engaged, the racks 31 and gears 32 will be caused to automatically mesh by means of a spring 92. When the lever 89 is moved backwardly a latch 93 will also move backwardly, being so moved by a contacting plate 94 carried by a trip-lever 95. The function of the latch 93 and trip-lever 95 as well as the plate 94 will be hereinafter explained.

To cause the shaft 8 to come to rest when the zero indications aline with the openings 3, I provide the shaft 11 with the disk 96 having a stop 97 (Figs. 6 and 8) arranged to be engaged by a pawl 98 secured to shaft 99 carried by the frame-members 79 and 80. The pawl 98 is set so as to engage the stop 97 when the zero indications reach the openings 3 and arrest further movement of the shaft 8.

To lock the shaft 8 against movement when the disks 6 are at the zero position, I provide a shaft 99 with fixed arms 100 (Fig. 8) one arm for each disk 6, and a pawl 98 to engage a stop 97 on the shaft 11. Each arm 100 enters a recess 101 in an adjacent disk 6 when the said disk reaches the zero position. As long as the arm 100 and recess 101 are engaged the shaft 11 cannot be turned to rotate the shaft 8 as the pawl 98 and stop 97 will be in engagement, but when a chain 4 is manipulated and when the disk 6 operated thereby rotates, each arm 100 will be depressed, thereby rotating the shaft 99, carrying the pawl 98 away from the stop 97. By means of the shaft 11 gears 8 and disk 85, I cause the disk to come to the zero point when the handle 12 is turned and I also lock the disks in such position by means of the pawl 98 and stop 97; hence the handle 12 cannot be turned until a chain 4 is manipulated which will cause the arms 100 to release the pawls 98.

To insure the positive return of the type-carriers 25, I provide means to hold the racks 31 out of engagement with the gears 32 long enough to permit the carriers 25 to drop, the said means being the hereinbefore mentioned latch 93 shown in Figs. 2 and 7. When the rocking-frame 28 is moved forward the arm 91 carried thereby will engage the notch 102 in the latch 93, where it will remain locked and prevent the return of the racks 31 until the said latch is moved away from said arm 91 by the action of the trip-lever 95 which carries the plate 94 which in turn contacts with the latch 93, as shown in Fig. 2.

To actuate the trip lever 95, I provide a pivotal arm 103 secured at 104 to the frame-member. The arm 103 carries a pivotally mounted tripping-block 104 arranged to engage a pin 105 on the trip-lever 95. Under normal conditions the block 104 rests upon the pin 105 as shown in Fig. 2; but when the arm 103 is moved ahead by the action of the adjacent link 43, when the escapement-bar 41 is depressed, the block 104 will leave said pin. When the link 43 again moves back, when the bar 41 is released, the face 106 of the block 104 will strike the pin 105 and the block 104 will ride up upon the pin 105, but the spring 107 will offer sufficient resistance to cause the trip-lever 95 to move ahead enough to cause the plate 94 to move or kick the latch 93 away from the arm 91, after which the racks 31 will return. A pin 108 serves to draw the arm 103 backwardly when the link 43 moves ahead. The lever 95 is secured to the shaft 90.

In order to get a hammer effect to kick off the latch 93 by a sudden blow, I provide a keeper 109 (Figs. 2 and 7) having a notch 110 to engage a pin 111 on the frame member 79. The keeper 109 is pivotally secured to the arm 103 at 112 and moves backwardly with the arm 103. When the arm 103 is drawn backwardly the notch 110 will engage the pin 111 and the said keeper will remain in such position, holding the arm 103 and thereby preventing its movement to kick the latch off until the proper time. The releasing of the keeper 109 depends upon the movement of the last chain advancing pawl-frame 113, some of said frames being shown in Fig. 5, the said last frame being indicated in Fig. 14. The function of the bar 45 is to actuate the pawl-frames 113, and each time that the escapement-bar 41 is depressed the bar 45 moves downwardly, thereby depressing the pawl-frames 113. As can be seen in Fig. 14, the curved end 114 of the keeper 109 alines with the frame 113. When the bar 45 is drawn ahead the frames 113 will swing upon the pivot point or rod 115 to the position shown in Fig. 10; at the same time the keeper 109 will be drawn ahead and engage the pin 111, after which the curved end 114 of the keeper 109 will rest in contact with its adjacent frame 113. When the bar 41 is released the bar 45 will move upwardly, and also the link 43, but the arm 103 will not move until the movement of the returning frame 113 forces the end of the keeper downwardly sufficiently to cause the notch 110 to leave the pin 111, after which the spring 115 will draw the arm 103 back, thereby releasing the mechanism that operates the latch 93. From the foregoing it will be seen that the racks 31 cannot mesh with the gears 32 until the carriers have had plenty of time to drop. It is also apparent from the foregoing description that the racks 31 and gears 32 are thrown out of mesh automatically when the handle 12 is operated to return the disks 6 to zero.

I will now describe the mechanism for automatically advancing a disk when an adjacent disk passes the zero point upon a continued rotation or a portion of a rotation. Due to the fact that I am able to record items, and the totals thereof, it becomes necessary to provide a mechanism that will not cause the advancement of a disk until the escapement bar is depressed. For example, should I desire to record the items 99 and 6, making 105, I would manipulate the chains in the columns 2 and 2ª, to cause 99 to appear at the openings 3 in line therewith. In a manner described, I would record same on the paper. I would then manipulate the chain in column 2 by placing a finger at 6 and drawing the chain down; this will raise the slide 25 to cause the type for 6 to aline with its hammer 33; but the numeral 95 would appear in the openings. When the bar 41 is depressed, the numeral 6 would be recorded on the sheet of paper, but the downwardly moving bar 45 would actuate the frames 113 downwardly, causing the pawls 116 (Figs. 10 and 11) thereon to lower. The pawl 116 opposite the disk 6 in column 2 will, when depressed, engage the adjacent bar 5 of its chain 4, because the disk 6, for said pawl, has been rotated past the zero mark when the number 6 was recorded, as will be explained later. When the bar 41 returns to normal position, or rises, the frames 113 will return under the influence of the springs 117, which action will advance the disk in column 2ª one step or to zero. The setting of the disk 6 at column 2ª to zero will cause the pawl 116 opposite the chain 4 for column 2ᵇ to advance its disk one step, or to 1; hence 105 will appear at the openings 3, 3, 3 opposite the columns 2, 2ª and 2ᵇ. The operation of the pawl mechanism will be described in detail later. It will be seen that no disk 6 advances automatically until after the bar 41 has been released; hence the total of items amounting to over 100 does not appear at the openings 3 until after the bar 41 has been released.

I will now describe the automatic operation of the disks 6. No disk can be rotated continuously past the numeral 9, because the racks 31 will strike the plate 51 when 9 appears at an opening 3. In other words, the zero cannot be brought into view by the continuous rotation of any disk 6, but after the bar 41 has been depressed and released any disk previously operated can be rotated past the zero point.

Each disk 6 carries a pin 118 (Figs. 9 and 10) located opposite the zero point, which actuates a swinging lever 119 carrying a guide 120 for a pin 121 on the pawls 116, the said pins being securely fastened to said pawls. Until the zero mark reaches a point adjacent an opening 3 the guide 120, which normally is positioned above the path of movement of its pin 121, will prevent the pawl 116 from engaging its chain even though the frame 113 be depressed; but during the passage of a disk from 9 to zero the pin 118 will strike and raise the lever 119, causing the guide 120 to leave the path of movement of the pin 121; hence the pawls 116 when depressed, under the influence of the spring 122, will engage a chain 4, as has been described upon their upward stroke.

When a lever 119 has been actuated to permit a pawl 116 to engage a chain 4, the lever 119 will remain in its raised position, as shown in Fig. 10, by a latch 123, which will fall upon the heel 124 of the lever 119 and hold it in the raised position. The latches 123 are pivotally supported on the shaft 90 (see also Fig. 5). The levers 119 are pivotally supported on a bar 126 and are returned to the normal position, after a pin 118 clears the end of a lever 119, by a spring 127 (Fig. 5), one end of which is secured to the shaft 90, the other end to a lever 119. The levers 119 are all held by a latch 123, one for each lever, when they are raised by their respective disks 6. When a lever 119 is held by its latch 123 it will not fall back when its pin 118 leaves the end of the lever 119; hence the pawl is given time to advance its chain 4 when the space-bar is released and the bar 45 allowed to rise under the influence of the spring 69. For instance, if the disk 6 in column 2 (Fig. 3) be advanced to 9, the pin 118 on said disk 6 would not move the lever 119 in said column; but should the said disk be moved to zero, the pin 118 would raise the lever 119 during such movement, to permit the pawl 116 to engage the chain 4, for the disk 6, in column 2ª, when the bar 45 is again depressed by the action of the space-bar 41; at the same time the latch 123 in column 2 would engage the heel of the lever 119, as shown in Fig. 10. When the space-bar 41 is again depressed and released the pawl 116, engaging the chain 4 in column 2ª, would advance the corresponding disk 6 one step; hence 10 would appear at the openings 3 and 3 in line with the slots, in the plate 23, for the said columns 2 and 2ª.

Should the disk 6 in column 2ª be moved to zero, or advanced nine steps, one step having already been produced, the lever 116 in column 2ª would be raised and latched by its latch 123 to cause the pawl 116 in column 2ᵇ to advance its disk one step, thus producing 100 in openings 3, 3 and 3, for the columns 2, 2ª and 2ᵇ, the next time that the bar 45 is depressed and raised, and so on through the line of carriers.

The purpose of the beforementioned latches is to prevent the actuation of a disk until the space-bar has been released in order that the selected items can be printed during the downward movement of the space-bar. If the disks were advanced during the downward movement of the space-bar, a correct record could not be taken.

When a lever 119 is latched down, (say in column 2 for instance) and the disks in columns 2, 2ª and 2ᵇ are set at 0, 9 and 9 respectively, the numerals in the openings 3, 3 and 3 for said columns will read 990. When the space-bar 41 is depressed, the bar 45 will depress the frames for the pawls in columns 2ª and 2ᵇ, the frame in column 2 being already down. When the space-bar 41 is released, the pawl-frame in column 2ª will rise first and carry its disk to zero; this action on the part of said disk will set the pawl for column 2ᵇ. The frame in column 2ᵇ will now rise and advance its disk to 0. This action on the part of the disk in column 2ᵇ will set the lever 119 in column 2ᶜ and the pawl 116 therefor will advance its disk to 1; hence the numerals in openings 3, 3, 3 and 3 for columns 2, 2ª, 2ᵇ and 2ᶜ will read 1000. The foregoing described action will be a successive one, that is to say, the movement of the pawls under the influence of their springs 117 will follow in quick succession; one pawl will not wait until another pawl has completed its movement.

To prevent the simultaneous movement of the pawl-frames when the space-bar 41 is released, I provide retarding members 128 (Figs. 5 and 9). Each retarding member carries an arm 129, which bears against the heel of a pawl-frame 113, the said retarding members being carried by a bar 130 and an arm 131 which engages an adjacent pawl-frame, as shown in Fig. 14. In other words, the arm 131 carries a stop 133 which engages its pawl-frame when said frame is depressed.

While the pawl-frames are being depressed, by the action of the bar 45, the arm 129 of each retarding member 128 will be forced outwardly, thereby rotating its retarding member slightly against the tension of a spring 134 (Fig. 14) thereby carrying the stop 133 away from the adjacent pawl-frame, which permits the said adjacent pawl-frame to be depressed; this occurring throughout the line. As soon as the frames have been depressed, the retarding members will be moved or rotated to the normal position by their springs 134, which causes the stops 133, on said retarding members, to engage their pawl-frames (see dotted lines Fig. 14) and hold them down temporarily. Each pawl-frame, excepting the frame in column 2ª (Fig. 5) is provided with a recess 135, and each frame, excepting the frame in column 2ª, is engaged at a certain time by retarding member 128. The frame in column 2ª is the master-frame and controls the operation of all the other frames when a successive automatic operation of the disks 6 takes place.

To produce the aforesaid result of 1000, the disks 6 in columns, 2, 2ª, 2ᵇ were set, it will be remembered, at 990, the pawl frame in column 2ª being latched. When the bar 41 was depressed (I am now writing in the past tense), the frames in the columns mentioned were depressed; hence all of the retarding devices throughout the line were depressed and caused to engage their respective pawl-frames. Upon the return of the bar 45, the pawl-frame in column 2ª rose, also carrying the disk in column 2ª to zero; this movement on the part of the last named pawl-frame rotated the retarding member 128 controlled thereby and released the frame in column 2ᵇ, which carried its disk to zero. The frame for column 2ᶜ was likewise released and carried its disk to 1; hence the result of 1000.

To prevent the return of the space-bar 41 until completely depressed, I provide the arm 40 on the frame-member 80 with a pawl 136 arranged to pass over a series of teeth 137 (see Fig. 6) carried by a block 138 on the frame member 80, but will engage said teeth should the bar be released before completely depressed. This feature will compel the complete depression of the space-bar 41 before it can be returned to normal position. A complete depression of the bar 41 will cause the pawl 136 to pass beyond the lower edge of the block 138; hence when the bar 41 rises the pawl 136 will drag over the teeth 137.

Figs. 15 and 16 illustrate a modified form of hammer stop, consisting of a plurality of slides 139 and 140 (Fig. 15) connected by a pivoted fork 141 (Fig. 16). To operate the slides, I provide the slide 139 with a horn 140ª to be engaged by the lever 56. A spring 142ª operates the slides when the lever 56 is moved by the space-bar mechanism. This form of device operates in manner similar to the slide 53. The fork 141 transmits motion from the slide 139 to the slide 140. The slide 139 carries a blocking-off plate 142 for the same purpose as the plate 52 on the slide 53. The slide 140 carries a stop 143 for the same purpose as the stop 64 on the slide 53. The sheet of paper B may be fed from a roll (not shown).

The latches 123, which hold the levers 119 depressed, are moved away from said levers, to allow the levers to resume their normal position by the action of the lever 95, when said lever is moved ahead by the block 104. For this purpose the shaft 90, which carries the latches 123, is provided with pins 144 (Figs. 5 and 9) which, when said shaft 90 is partly rotated, push the latches 123 off the heel of the levers they engage.

Having now described my invention, what I claim and desire to secure by Letters Patent is:

1. In combination with an adding machine, a record sheet, a plurality of vertically movable type carriers, means to actuate said carriers, a swinging frame adjacent thereto, a hammer for each carrier carried by said frame and slidably mounted thereupon, means to actuate said frame to cause all of the hammers thereon to move toward the sheet and to force said sheet against the type on said carriers, and means to block off the hammers corresponding to the carriers not in use.

2. In combination with an adding machine, a record sheet, a plurality of vertically movable type carriers, a swinging frame adjacent thereto, a hammer for each carrier carried by said frame and slidably mounted thereupon, means to actuate said frame to cause the hammers thereon to force said sheet against the type on said carriers, a slidable frame adjacent said hammers, a plate carried thereby arranged to block off the hammers on said frame, and a stop carried by said frame arranged to contact with a raised type-carrier to cause the plate on said slidable frame to come to rest adjacent the hammers to be blocked off.

3. In an adding machine, a plurality of independently operable numeral-carriers, means to actuate said carriers to cause the numerals carried thereby to aline with a given point, a printing mechanism to record the numeral selected, means operable by the carrier operating mechanism to actuate said printing mechanism, means to restore the printing mechanism to zero without disturbing said numeral-carriers, an independent device to restore the numeral-carriers to zero, and means operable by the numeral carrier restoring mechanism to automatically prevent the actuation of the printing mechanism during the numeral-carrier restoring operation.

4. In an adding machine, a plurality of disks containing numerals, means to rotate same by the fingers, a space-bar to automatically advance said disks one step, a type-carrier for each disk, means operable by the numeral carrier operating means to set the type-carrier, an impression device for said type-carriers, means operable by the space-bar to actuate said impression device and to restore said type-carriers to normal position, and means also operable by said space-bar to block off the type on the carriers not in use.

5. In an adding machine, the combination of a plurality of independently operable numeral-carriers, means operable by the fingers to actuate same, a space-bar, means operable by the space-bar to advance said carriers one step, a movable support adjacent said carriers, a plurality of levers supported by said movable support, a type-carrier carried by each lever, means actuated by the operating means for said carriers to operate said levers, an impression device for the type on said type-carriers, means operable by the space-bar to actuate the impression device, and means also operable by the space-bar to move said lever support to carry said levers out of engagement with the operating device for the numeral-carriers.

6. In an adding machine, the combination of a plurality of independently operable numeral-carriers, means operable by the fingers to actuate same, a space-bar, means operable by the space-bar to advance said carriers one step, a movable support adjacent said carriers, a plurality of levers supported by said movable support, a type-carrier carried by each lever, means actuated by the operating means for said carriers to operate said levers, an impression device for the type on said type-carriers, means operable by the space-bar to actuate the impression device, means also operable by the space-bar to move said lever support to carry said levers out of engagement with the operating device for the numeral carriers, and means operable by the space-bar to block-off the type on the type-carriers not in use.

7. In an adding machine, the combination of a plurality of independently operable numeral-carriers, means operable by the fingers to actuate same, a space-bar, means operable by the space-bar to advance said carriers one step, a movable support adjacent said carriers, a plurality of levers supported by said movable support, a type-carrier carried by each lever, means actuated by the operating means for said carriers to operate said levers, an impression device for the type on said type-carriers, means operable by the space-bar to actuate the impression device, means also operable by the space-bar to move said lever support to carry said levers out of engagement with the operating device for the numeral-carriers, a slide adjacent said type-carriers, a plate carried thereby arranged to be moved into the path of movement of the impression device to block off the type on the carriers not in use, and a lever operable by the space-bar to control the operation of said slide.

8. In an adding machine, the combination of a plurality of independently operable numeral-carriers, means operable by the fingers to actuate same, a space-bar, means operable by the space-bar to advance said carriers one step, a movable support adjacent said carriers, a plurality of levers supported by said movable support, a type-carrier carried by each lever, means actuated by the operating means for said carriers to operate said levers, an impression device for the type on said type-carriers, means operable by the space-bar to actuate the impression device, means also operable by the space-bar to move said lever support to carry said levers out of engagement with the operating device for the numeral-carriers, a slide adjacent said type-carriers, a plate carried thereby arranged to be moved into the path of movement of the impression device to block off the type on the carriers not in use, a lever operable by the space-bar to control the operation of said slide, and a spring to move said slide when said lever is operated.

9. In combination with an adding machine, a plurality of type-carriers, a hammer for each carrier, a movable frame for said hammers, each of said hammers being provided with a slot, pins carried by said frame passing through the slots in said hammers, a slidable frame adjacent said hammers, a plate carried thereby arranged to be moved into the path of movement of said hammers, means to actuate said type-carriers, means to operate said hammer-frame, means operable by the hammer-frame actuating means to control the operation of said slidable frame, and means to cause the plate on said slidable frame to come to rest in line with the type on the type-carriers not in use.

10. In an adding machine, a plurality of rotatable disks provided with numerals, means operable by the fingers to rotate said disks for more than one step, pawls to advance said disks step by step, pivotal frames for said pawls, means to operate said frames to cause said pawls to operate the disks, a printing-mechanism operable by the disk-operating mechanism, means operable by the actuating device for the pawl-frames to take an impression from the printing-mechanism, means to cause the return of said printing-mechanism to the normal position, and means operable by one of the pawl frames to hold said printing-mechanism operating means out of engagement with the actuating means therefor until the printing-mechanism has returned to normal.

11. In combination with the numeral disks of an adding machine, an operating mechanism therefor, a shaft for said disks provided at one end thereof with a disk having a cam notch, a printing mechanism operable by the operating mechanism for the numeral disks, a pawl to engage the notch in the disk on the numeral shaft, a lever operable by said pawl, means to restore said numeral disks to zero, and means operable by the pawl actuated lever to move the printing device out of operative relationship with the numeral disk operating mechanism when the numeral disks are being restored to zero.

12. In an adding machine, a plurality of numeral-carriers, operating means for each carrier, a sprocket operable by each carrier-operating-means, a gear carried by each sprocket, a type-carrier for each numeral-carrier, a lever for each type-carrier, a movable support for said levers, a rack carried by each lever normally engaging the gear on said sprocket, an arm carried by the lever support, a latch therefor, means to rock said lever-support to cause the arm thereon to engage its latch while said type-carriers are being restored to normal, and means to trip said latch to release said lever-support when said type-carriers are restored to normal.

13. In an adding machine, a plurality of numeral-carriers, operating means for each carrier, a sprocket operable by each carrier-operating-means, a gear carried by each sprocket, a type-carrier for each numeral carrier, a lever for each type-carrier, a movable support for said levers, a rack carried by each lever normally engaging the gear on said sprocket, an arm carried by the lever support, a latch therefor, means to rock said lever-support to cause the arm thereon to engage its latch while said type-carriers are being restored to normal, means to trip said latch to release said lever-support when said type-carrier are restored to normal, means to return said numeral-carriers to zero, and means to rock said lever support, to cause the racks on said levers, and gears on said sprockets, to become disengaged while the numeral carriers are being returned to zero.

14. In an adding machine, a plurality of numeral-carriers, operating means for each carrier, a sprocket operable by each carrier-operating-means, a gear carried by each sprocket, a type-carrier for each numeral carrier, a lever for each type-carrier, a movable support for said levers, a rack carried by each lever normally engaging the gear on said sprocket, an arm carried by the lever support, a latch therefor, means to rock said lever-support to cause the arm thereon to engage its latch while said type-carriers are being restored to normal, means to trip said latch to release said lever-support when said type-carriers are restored to normal, pawls to advance said numeral-carriers step by step, means to actuate said pawls, a space-bar connected to said pawl actuating means, and means controlled by the operation of the space-bar to trip the latch for the arm on said movable support.

15. In an adding machine, a plurality of numeral-carriers, operating means for each carrier, a sprocket operable by each carrier-operating-means, a gear carried by each sprocket, a type-carrier for each numeral-carrier, a lever for each type-carrier, a movable support for each lever, a rack carried by each lever normally engaging the gear on said sprocket, an arm carried by the lever support, a latch therefor, means to rock said lever-support to cause the arm thereon to engage its latch while said type-carriers are being restored to normal, means to trip said latch to release said lever-support when said type-carriers are restored to normal, an impression device for the type on said type-carriers, and means controlled by the operation of the space-bar to block-off the type on the carriers not in use.

16. In an adding machine, a plurality of numeral-carriers, a printing mechanism therefor, consisting of a plurality of type-carriers, means to operate said numeral-carriers, means operable thereby to actuate the type-carriers, a slide adjacent said type-carriers and arranged to be moved to contact with an actuated type-carrier, an impression device comprising a plurality of slidably mounted hammers, each type-carrier coacting with one of said hammers, a slide adjacent said hammers arranged to be moved into the path of movement of said hammers, and means to operate both of the aforesaid slides in unison.

17. In an adding machine, a plurality of movable carriers provided with numerals, means to independently move said carriers to cause any of the numerals thereon to aline with a given point, a plurality of type-bars, means to operate said bars in unison with the numeral-carriers, an impression device for the type on said type-bars, a lever to actuate said impression device and means controlled by said lever to block off that portion of the impression device corresponding to the type-bars not in use.

18. In an adding machine, a plurality of movable carriers provided with numerals, means to independently move said carriers to cause any of the numerals thereon to aline with a given point, a plurality of type-bars, means to operate said bars in unison with the numeral-carriers, an impression device for the type on said type-bars, a lever to actuate said impression device and a slidable plate to block off that portion of the impression device corresponding to the type-bars not in use, the movement of said plate being controlled by the impression device actuating-lever.

19. In an adding machine, a plurality of movable carriers provided with numerals, means to independently move said carriers to cause any of the numerals thereon to aline with a given point, a plurality of type-bars, means to operate said bars in unison with the numeral-carriers, an impression device for the type on said type-bars, a lever to actuate said impression device, a slidable plate to block off that portion of the impression device corresponding to the type-bars not in use, a spring to operate said plate, an arm to normally prevent the operation of said slide, and means operable by the impression device operating lever to actuate said arm to permit said spring to actuate said plate.

20. In an adding machine, a plurality of movable carriers provided with numerals, means to independently move said carriers to cause any of the numerals thereon to aline with a given point, a plurality of type-bars, means to operate said bars in unison with the numeral-carriers, an impression device for the type on said type-bars, consisting of a frame, a plurality of hammers, slidably supported thereby, there being a hammer for each type-bar, a slidable plate adjacent said hammers, a lever to actuate said impression device, a spring to move said plate into the path of movement of said hammers, and means controlled by the impression device operating lever to control the action of said spring.

21. In an adding machine, a plurality of movable carriers provided with numerals, means to independently move said carriers to cause any of the numerals thereon to aline with a given point, a plurality of type-bars, means to operate said bars in unison with the numeral-carriers, an impression device for the type on said type-bars, a lever to actuate said impression device, slidable plate to block off the type-bars not in use, a spring to actuate said plate, an arm to normally prevent the operation of said plate, a rotatable shaft to which said arm is secured, a relatively short arm carried by said shaft, said short arm being located in the path of movement of the actuating lever for said impression device and positioned relative thereto to rotate said shaft when said lever is operated, to move the arm carried thereby away from said slide to permit said slide to operate.

22. In an adding machine, a shaft, a plurality of numeral disks loosely mounted thereupon, a gear carried by said shaft at one end thereof, a rotatable shaft adjacent said disk, a plurality of arms carried by said second shaft, there being an arm for each numeral disk, means carried by each of said disks to engage an adjacent arm when said numeral disks are positioned at zero, a third shaft adjacent said numeral disks, a gear carried by said third shaft meshing with the gear on the shaft for said numeral disks, and means operable by said second shaft to lock the third shaft against rotation when said numeral disks are positioned at zero.

23. In an adding machine, a shaft, a plurality of numeral disks loosely mounted thereupon, a gear carried by said shaft at one end thereof, a rotatable shaft adjacent said disk, a plurality of arms carried by said second shaft, there being an arm for each numeral disk, means carried by each of said disks to engage an adjacent arm when said numeral disks are positioned at zero, a third shaft adjacent said numeral disks, a gear carried by said third shaft meshing with the gear on the shaft for said numeral disks, a stop carried by said third shaft, means carried by the second shaft to engage said stop to prevent the rotation of the third shaft when said numeral carriers are positioned at zero.

24. In an adding machine, a shaft, a plurality of numeral disks loosely mounted thereupon, a gear carried by said shaft at one end thereof, a rotatable shaft adjacent said disk, a plurality of arms carried by said second shaft, there being an arm for each numeral disk, means carried by each of said disks to engage an adjacent arm when said numeral disks are positioned at zero, a third shaft adjacent said numeral disks, a gear carried by said third shaft meshing with the gear on the shaft for said numeral disks, a stop carried by said third shaft, an arm carried by said second shaft to engage said stop and prevent the rotation of the third shaft when said numeral disks are positioned at zero.

25. In an adding machine, a printing mechanism, a plurality of numeral carriers, means to actuate said carriers and printing mechanism simultaneously, a shaft for said carriers upon which said carriers are loosely mounted, means to rotate said shaft to set the carriers in the zero position, means carried by said shaft to set said carriers in the zero position when said shaft is rotated, and means operable by said shaft to prevent the operation of the printing device during the resetting of the carriers to the zero position.

26. In an adding machine, a printing mechanism, a plurality of numeral carriers, means to actuate said carriers and printing mechanism simultaneously, a shaft for said carriers upon which said carriers are loosely mounted, means to rotate said shaft to set the carriers in the zero position, means carried by said shaft to set said carriers in the zero position when said shaft is rotated, means to disengage said printing mechanism from its operating device, and means operable by the numeral carrier shaft to operate the disengaging means for the printing mechanism during the operation of setting the numeral disks to zero.

27. In an adding machine, a printing mechanism, a plurality of numeral carriers, means to actuate said carriers and printing mechanism simultaneously, a shaft for said carriers upon which said carriers are loosely mounted, means to rotate said shaft to set the carriers in the zero position, means carried by said shaft to set said carriers in the zero position when said shaft is rotated, means operable by said shaft to prevent the operation of the printing device during the resetting of the carriers to the zero position, means to disengage said printing mechanism from its operating device, means operable by the carrier shaft to operate the disengaging means for the printing mechanism during the operation of setting the numeral carriers to zero, means to lock the printing mechanism in the disengaged position, and means to release the locking mechanism for the disengaged printing device, after the carriers have been set at zero.

28. In an adding machine, a rotatable shaft, a plurality of numeral carriers loosely mounted thereupon, means carried by said shaft to set said carriers to zero, a printing mechanism, a movable support therefor, means to operate the printing mechanism, and means operable by the carrier shaft to move said support to disengage the printing mechanism from its operating mechanism during the operation of setting the carriers to zero.

Signed at New York city, N. Y., this 2d day of July, 1915.

ORAZIO ANTONELLI.

Witnesses:
 THOMAS BLOCH,
 EDWARD A. JARVIS.

Copies of this patent may be obtained for five cents each, by addressing the "Commissioner of Patents, Washington, D. C."